April 21, 1931.  R. R. NORWOOD  1,802,061
FOOD MIXER
Filed March 28, 1930    2 Sheets-Sheet 2
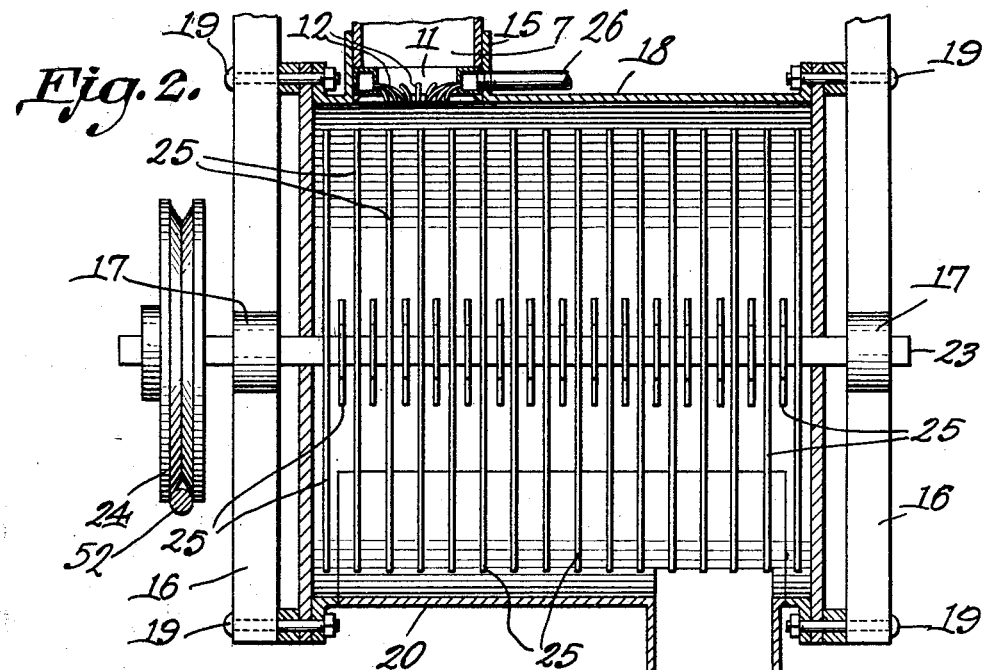
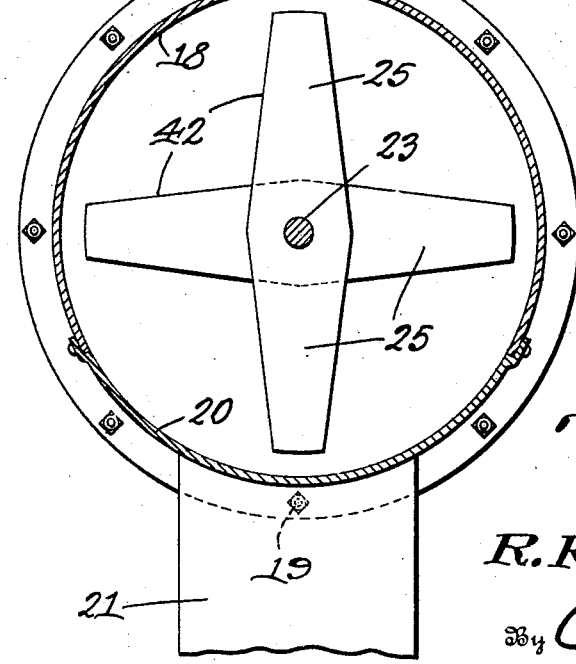
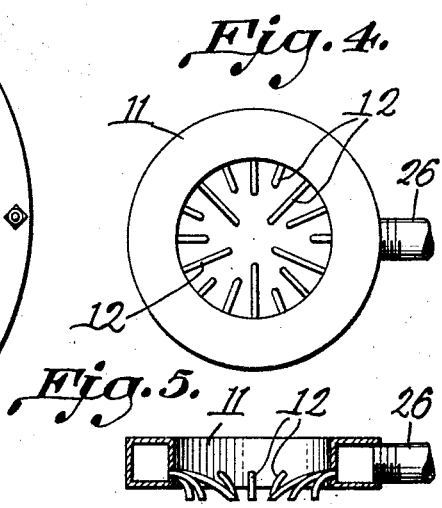
R. R. Norwood, Inventor Patented Apr. 21, 1931

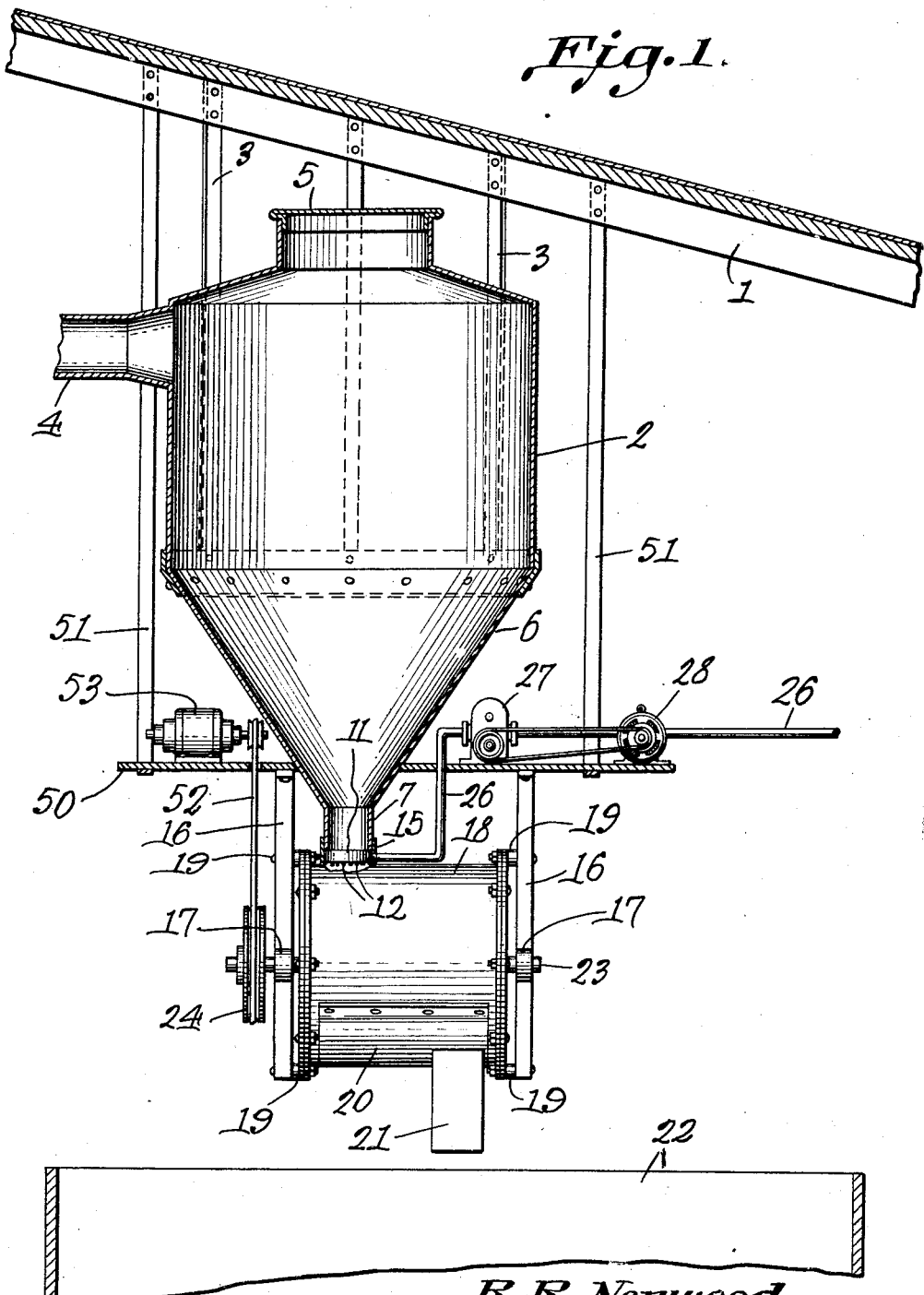

1,802,061

UNITED STATES PATENT OFFICE

ROBERT R. NORWOOD, OF MINERAL WELLS, TEXAS

FOOD MIXER

Application filed March 28, 1930. Serial No. 439,755.

This invention aims to provide a simple means whereby feed of the kind that is provided for the domestic animals may be mixed with molasses.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 is a vertical section showing a device constructed in accordance with the invention, parts appearing in elevation;

Figure 2 is a sectional view of the mixer;

Figure 3 is a transverse section of the mixer;

Figure 4 is a plan of the spreader for the liquid;

Figure 5 is a sectional view of the spreader.

The numeral 1 marks a support, such as the roof of a building, below which is located a receptacle 2. The receptacle 2 may be connected to the support 1 by hangers 3. A platform 50 is attached to the receptacle 2 and is connected to the support 1 by hangers 51. An inlet pipe 4 communicates with the receptacle 2 and the receptacle is surmounted by a removable lid 5. The receptacle 2 has a tapered bottom communicating with an outlet pipe 7. The lower end of the outlet pipe 7 extends into a collar 15 on the cylindrical body 18 of a mixer, the body 18 being secured at its ends, as shown at 19, to hangers 16 carried by the platform 50, the hangers being supplied intermediate their ends with bearings 17. The body 18 of the mixer has a removable bottom 20 carrying a depending spout 21 which discharges into a bin 22.

The distributor for the molasses includes a ring 11. Nozzles 12 are mounted in the inner surface of the ring 11. The nozzles are of adjusted lengths, and all of the nozzles extend inwardly and downwardly. All of the nozzles, preferably, terminate in about the same horizontal plane, and the construction is such that no nozzles will be likely to smear the other nozzles and prevent the feed from passing downwardly through the ring 11. Figure 4 shows, however, that the nozzles 12 are so arranged that the feed passing downwardly through the ring 11 from the receptacle 2 will receive a thorough admixture of molasses. The ring 11 is located in the collar 15 of the mixer, and the outlet pipe 7 of the receptacle 2 rests on the ring 11. A shaft 23 extends through the body of the mixer from end to end, and is journaled in the bearings 17. The device includes any suitable means whereby rotation may be imparted to the shaft 23 of the mixer. For instance, a pulley 24 may be mounted on the mixer shaft, and may be engaged by a belt 52 driven by a motor 53 on the platform 50. Builders may wish to change this drive, and they are at liberty to do so.

Transverse arms 25 are mounted intermediate their ends on the shaft 23, within the body 18 of the mixer. The arms may be straight, and may be shaped toward their ends, as shown at 42. The arms 25 are set at an angle of ninety degrees with respect to each other, an observation which will be understood readily when Figures 2 and 3 are compared.

The numeral 26 indicates a molasses supply pipe leading to the ring 11 of the distributor. In the pipe 26 is interposed a pump 27 driven by a motor 28. Both the pump 27 and the motor 28 may be mounted on the platform 50, if desired. Some persons prefer to heat the molasses proceeding through the pipe 26, and this may be done by any suitable means (not shown).

In practical operation, the molasses proceeding through the pipe 26, under the impulse of the pump 27, is distributed through the nozzles 12, and a thorough mixture of molasses and feed is brought about whilst the feed is passing downwardly under air blast from the receptacle 2, through the outlet pipe 7, into the body 18 of the mixer.

When the shaft 23 is rotated, by the pulley 24, the belt 52, and the motor 53, or an equivalent mechanism, the arms 25 stir up the mass of feed and molasses within the body 18 of the mixer, and bring about homogeneity in the product. The pipe 7 is located near to one end of the body 18 of the mixer, and the spout 21 is located near to the opposite end of the mixer, and by the time that the feed has moved from one end of the body 18 to the other, a thorough mingling of feed and molasses has been brought about. The product flows downwardly through the spout 21 into the bin 22.

Having thus described the invention, what is claimed is:—

1. In a device of the class described, a mixer, an annular molasses distributor having a plurality of nozzles of different lengths projecting toward the center of the distributor and discharging downwardly into the mixer, means for supplying molasses to the nozzles, and means for discharging feed about the nozzles into the mixer.

2. A device for mixing molasses or the like with ground feed for animals, embodying a plurality of molasses nozzles arranged about a central, open space, and means for forcing the feed under air blast through said space, thereby to effect a coating of the particles of feed with molasses from the nozzles, and to keep the nozzles clear.

3. A device for mixing molasses or the like with ground feed for animals, embodying a plurality of molasses nozzles arranged about a central open space, means for forcing the feed under air blast through said space, the nozzles being inclined in the direction of the air blast as it passes through said space, and means for forcing molasses out of the nozzles in the general direction of the air blast as the air blast moves through said space.

In testimony that I claim the foregoing as my own, I have hereto affixed my signature.

ROBERT R. NORWOOD.